United States Patent
Lamborn et al.

(10) Patent No.: US 9,122,443 B1
(45) Date of Patent: Sep. 1, 2015

(54) SYSTEM AND METHOD FOR SYNCHRONIZING MULTIPLE VIDEO STREAMS

(75) Inventors: Edwin H. Lamborn, Riverton, UT (US); Robert J. Snow, Layton, UT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1346 days.

(21) Appl. No.: 12/150,913

(22) Filed: May 1, 2008

(51) Int. Cl.
*G02F 1/1333* (2006.01)
*G06F 3/14* (2006.01)

(52) U.S. Cl.
CPC ........ *G06F 3/1446* (2013.01); *G09G 2300/026* (2013.01)

(58) Field of Classification Search
CPC ....... H04N 5/08; H04N 5/10; H04N 5/23203; H04N 5/04; H04N 5/265; H04N 9/455
USPC ........................................... 348/547; 345/1.3
See application file for complete search history.

(56) References Cited

U.S. PATENT DOCUMENTS

| | | | | |
|---|---|---|---|---|
| 5,189,515 | A * | 2/1993 | Chen | 348/535 |
| 5,963,200 | A | 10/1999 | Deering et al. | |
| 6,195,086 | B1 | 2/2001 | Perlman et al. | |
| 6,316,974 | B1 * | 11/2001 | Taraci et al. | 327/147 |
| 6,646,645 | B2 * | 11/2003 | Simmonds et al. | 345/502 |
| 7,030,883 | B2 | 4/2006 | Thompson | |
| 7,295,248 | B2 * | 11/2007 | Suzuki | 348/536 |
| 7,499,044 | B2 * | 3/2009 | Kennedy et al. | 345/213 |
| 2004/0012578 | A1 | 1/2004 | Naegle | |
| 2005/0062549 | A1 * | 3/2005 | Lin et al. | 331/16 |
| 2005/0093854 | A1 * | 5/2005 | Kennedy et al. | 345/213 |
| 2006/0146972 | A1 * | 7/2006 | Wang et al. | 375/376 |
| 2007/0097263 | A1 * | 5/2007 | Kim | 348/521 |
| 2007/0132884 | A1 * | 6/2007 | Akiyama et al. | 348/521 |

OTHER PUBLICATIONS

Clark et al., Coherent Optical Phase-Modulation Link, IEEE Photonics Technology Letters, Aug. 15, 2007, 3 pages.
Clark et al., Photonics for RF Front Ends, IEEE Microwave Magazine, May 2011, 9 pages.
Valley et al., Photonic Analog-to-Digital Converters: Fundamental and Practical Limits, Proceedings of SPIE, 2004, 11 pages.
Valley, Photonic Analog-to-Digital Converters, A Tutorial, 2009, 48 pages.
Valley, Photonic Analog-to-Digital Converters, Optics Express, Mar. 5, 2007, 28 pages.
Zibar et al., Digital Coherent Receiver Employing Photonic Downconversion for Phase Modulated Radio-over-Fibre Links, IEEE Xplore, 2009, 4 pages.
Zibar et al., Digital Coherent Receiver for Phase-Modulated Radio-Over-Fiber Optical Links, IEEE Photonics Technology Letters, Feb. 1, 2009, 3 pages.

\* cited by examiner

*Primary Examiner* — Sahlu Okebato
(74) *Attorney, Agent, or Firm* — Angel N. Gerdzhikov; Donna P. Suchy; Daniel M. Barbieri

(57) ABSTRACT

A vertical synchronization circuit for synchronizing multiple video streams using an input vertical sync signal. The circuit includes a digital phase lock loop circuit configured to generate an intermediate frequency signal based on the input vertical sync signal and an analog phase lock loop circuit configured to convert the intermediate frequency signal into a pixel clock. They system further includes a counter configured to generate output synchronization signals based on the pixel clock.

20 Claims, 3 Drawing Sheets

SYSTEM AND METHOD FOR SYNCHRONIZING MULTIPLE VIDEO STREAMS

BACKGROUND

The present invention relates generally to the field of video signal generation. More particularly, the present invention relates to a system and method for synchronizing multiple video signals using only a vertical sync reference signal.

As monitors become less expensive, desktop PCs and workstations with multiple displays are rapidly becoming commonplace. Multiple screens can also be useful in fields such as simulation, where wraparound screens are needed for the realistic reproduction of the simulation environment. Simulation applications typically require a fast update of the image being displayed in order to present the illusion of smooth real-time motion.

Displaying real-time information on multiple screens can be technically challenging. For example, a three-channel simulation device might consist of a center screen, left screen, and a right screen. The three images should present a seamless view of the simulation environment to the observer. If the visual scene rolls, a consistent horizon line should be visible across the three channels. If, however, the video refresh of the three displays are running asynchronously, it is possible to see a discontinuity along that horizon line since each segment of the scene is displayed at different times. Therefore, for real-time or interactive applications, it is important to synchronize each of the display devices.

The pixel resolution of each of the displays may differ, but the vertical rate should be synchronized. For some applications, there is also a need to synchronize the vertical rate and phase of each of these displays to an external reference synchronization signal. In addition to scene artifacts, lack of synchronization can cause poor correlation with other system equipment such as sensor displays, motion systems, sound, etc. These anomalies can contribute to simulator sickness and reduces overall effectiveness of the simulation.

Traditional high-end simulation devices have provided a means to synchronize multiple display images via a video generator lock circuit. Video generator lock, or Genlock, generates a pixel clock locked in a predictable phase relationship to a lower frequency reference (usually the horizontal sync). In most cases, each of the video circuits to be locked run at the same frequency and the solution is straightforward using a standard line-locking phase lock loop (PLL). However, implementation becomes more difficult when two or more video circuits do not have the same line and pixel counts. With some combinations of line and pixel counts for the locked video circuits, standard PLLs cannot generate the pixel clock needed to maintain lock without adding discontinuities such as skipping some blanked pixels or lines. There are also situations where it is advantageous for all video circuits in the system to lock to an external system synchronization source that only has a vertical rate signal.

What is needed, therefore, is a system and method for synchronizing multiple video streams using a vertical rate reference sync signal. What is further needed is such a system configured to maintain low jitter while offering flexibility in choosing and line and pixel resolutions.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the invention relates to a vertical synchronization circuit for synchronizing multiple video streams using as its reference one of the input vertical sync signals. The circuit includes a digitally controlled circuit configured to generate a phase locked intermediate frequency signal which is higher than the frequency of the input vertical sync signal. Additionally, the circuit includes an analog phase lock loop circuit configured to convert the intermediate frequency signal into a pixel clock. The system further includes a circuit configured to generate output synchronization signals based on the generated pixel clock.

Another embodiment of the invention relates to a video synchronization system for synchronizing multiple video streams using a master, or external reference, vertical sync signal. The system includes a master computing system configured to provide video stream information to a plurality of video displays. The system is further configured to generate a master vertical sync signal configured to synchronize the display of the video stream information on the video displays and a video synchronization circuit associated with each of the plurality of displays. The video synchronization circuit includes a digitally controlled circuit configured to generate a phase locked intermediate frequency signal at a frequency higher than the frequency of the input vertical sync signal based on the master vertical sync signal, an analog phase lock loop circuit configured to convert the intermediate frequency signal into a pixel clock, and a circuit configured to generate output synchronization signals based on the pixel clock.

Yet another embodiment of the invention relates to a method for synchronizing multiple video streams using an input vertical sync signal. The method includes the steps of generating an intermediate frequency signal based on the input vertical sync signal at a frequency higher than the frequency of the input vertical sync signal using a programmable input configured to receive one or more characteristics of a target display, converting the intermediate frequency signal into a pixel clock using an analog phase locked loop circuit, and generating output synchronization signals based on the pixel clock.

Alternative examples and other exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
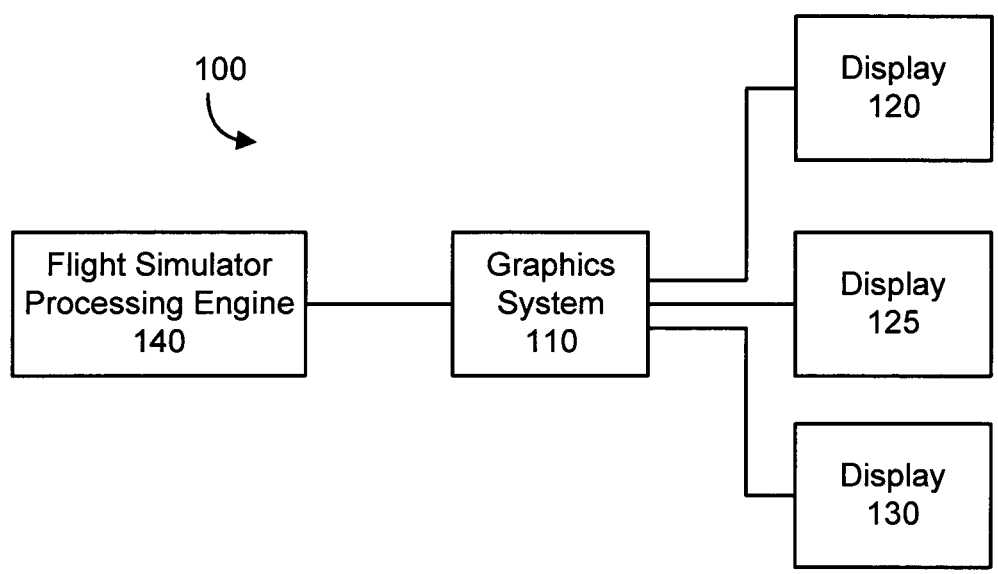
FIG. 1 is a simulation unit used to train pilots configured to display scenery a pilot would see as they look out the window of their vehicle, according to an exemplary embodiment.

Before describing in detail the particular improved system and method, it should be observed that the invention includes, but is not limited to, a novel structural combination of conventional data/signal processing components and communications circuits, and not in particular detailed configurations thereof. Accordingly, the structure, methods, functions, control, and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an aircraft simulation unit 100 used to train pilots and configured to display scenery a pilot would see as they look out the window or their aircraft is shown, according to an exemplary embodiment. Although simulation unit 100 is shown and described in here with reference to an aircraft simulation unit, it should be understood that the systems and methods described herein could be used in other simulators, such as a tank simulator, a submarine trainer, etc., or even a multi-display video game. Simulation unit 100 may include a graphics system 110 configured to drive a plurality of simulation displays for a front view display 120 and two side view displays 125 and 130, representing left and right side displays. Graphics system 110 may be a display management component coupled to a flight simulation processing engine 140 configured to implement a flight simulation software application. Although graphics system 110 is shown in FIG. 1 as a single system, it should be understood that graphics system 110 may include multiple graphics systems.

According to an exemplary embodiment, the images displayed on displays 120-130 may be so aligned as to create the appearance of a single unified display. Displays 120-130 may be implemented using three video projectors. Each video projector may, for example, be configured to project a 1920× 1080 resolution image at 60 Hz. The displays may have non-uniform resolutions, for example, one could be 1600× 1200 and another 1280×1024. Although multiple displays are shown and described, a single display may alternatively be used.

Multi-channel graphics system 110 may be configured to implement locked channels where displays 120-130 are locked to the same vertical rate such that at the start of a field, the displays are synchronized. The multi-channel graphics system 110 may further be locked in step with the flight simulation processing engine 140 such that the displays are also locked with events, sounds, motion effects, and display events generated by processing engine 140. One exemplary multi-channel graphics system is the EP-50/500/5000 graphic systems manufactured by Rockwell Collins, Inc. of Cedar Rapids, Iowa.

In order to implement the above described locked systems, the displays may be locked to a 60 Hz master signal (not shown). However, it is necessary to generate a pixel clock in excess of 100 MHz from this 60 Hz signal to match the pixel rates of the individual displays.

Figure 2:
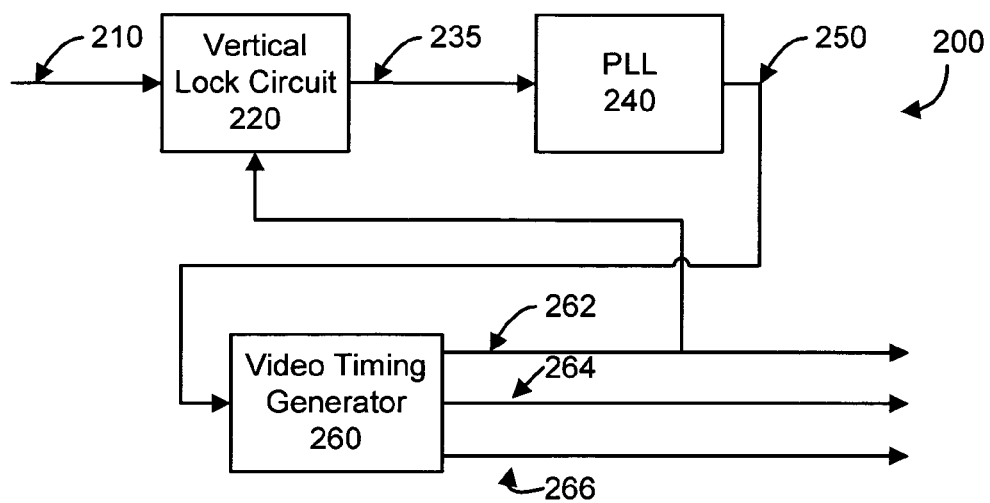
FIG. 2 is a video stream synchronization circuit configured to receive an input vertical sync (VSync) signal and generate an intermediate frequency signal (reference pulse) and a pixel clock as well as output synchronization signals (typically vertical and horizontal syncs) to be provided to a display, according to an exemplary embodiment.

Referring to FIG. 2, a video stream synchronization circuit 200 is shown configured to receive an input vertical sync (VSync) signal and generate output horizontal and vertical sync signals and video. These signals are locked to the input vertical sync and are provided to a display, according to an exemplary embodiment. Circuit 200 includes a digitally controlled vertical lock circuit 220 configured to create a reference pulse signal 235 from a vertical sync signal 210 and an analog phase locked loop circuit 240 configured to generate a pixel clock output 250. Pixel clock output 250 may be provided to a video timing generator 260 or counter configured to generate an output horizontal sync signal 264 provided to a display (not shown) and an output vertical sync signal 262 provided to the display and to Vertical lock circuit 220. Red, green, and blue video signals 266 are provided to the display synchronized to horizontal sync signal 264 and vertical sync signal 262. Although shown in a particular configuration and as having particular components, it should be understood that video stream synchronization circuit 200 may have more, fewer, and/or different components in a variety of configurations to provide the functionality described herein.

Input vertical sync signal 210 may be received from a computing system configured to implement a simulation application, the application driving a plurality of processes including controlling the video streams to be displayed. Vertical synchronization refers generally to the synchronization of display vertical blanking interval, the time difference between the last line of one frame or field of a raster display and the beginning of the next. Lack of synchronization can cause display anomalies such as discontinuities at screen boundaries and poor correlation with other system equipment such as sensor displays, motion, sound, etc.

Vertical lock circuit 220 is configured to receive input vertical sync signal 210 and implement a digital phase locked loop to create a reference pulse (typically HSync frequency) signal 235 from the input vertical sync signal 210. Vertical lock circuit 220 is configured to operate similar to a delay locked loop having a selectable delay circuit, described in further detail below with reference to FIG. 3. According to an exemplary embodiment, the reference pulse signal 235 generated by Vertical lock circuit 220 is configured to have the same horizontal sync frequency as the display for which the pixel clock output 250 is being generated.

Analog phase locked loop circuit 240 may be configured to have a low capture bandwidth and be designed to filter a delay tap step and multiply the received reference pulse signal 235 up to the final pixel clock value. Pixel clock signal 250 is configured to drive video timing generator 260 to create the output horizontal sync signal 264 and output vertical sync signal 262 to drive the output video display. The output vertical sync signal 262 is additionally fed back to the Vertical lock circuit 220, as described below with reference to FIG. 3, to determine and correct phase alignment between output vertical sync signal 262 and input vertical sync signal 210.

Video stream synchronization circuit 200 may further be configured to implement a fixed phase offset, configured to maintain a fixed phase offset between the input vertical sync signal 210 and the output vertical sync signal 262. Video stream synchronization circuit 200 may further be configured to implement a default sync generation capability configured to allow generation of the output vertical sync signal 262 in the absence of an input vertical sync signal 210.

Advantageously, the system of FIG. 2 allows utilization of displays having different line rates. The system of FIG. 2 further allows the display system to lock to a system providing a relatively low timing signal, such as 60 Hz.

In operation, video stream synchronization circuit 200 is configured to generate a low jitter high-frequency pixel clock using a two-stage approach. Jitter is an unwanted variation of one or more signal characteristics in electronics and telecommunications. Jitter may be seen in characteristics such as the interval between successive pulses, or the amplitude, frequency, or phase of successive cycles. Jitter is a significant factor in the design of almost all communications links. At a system level, the components of video stream synchronization circuit 200 create a phase locked loop having a very high multiplication factor and low locking bandwidth. It is a combination of a digitally controlled section (creating a digital phase lock loop similar to a delay-locked loop) that creates the intermediate frequency signal, "reference pulse," from the vertical sync signal followed by an analog phase locked loop to generate the final pixel clock and filter a small delay tap step. Video stream synchronization circuit 200 allows locking of vertical rates of multiple video sources to create a low jitter pixel clock using only the vertical sync communication. Each video stream may have different line and pixel counts.

Figure 3:
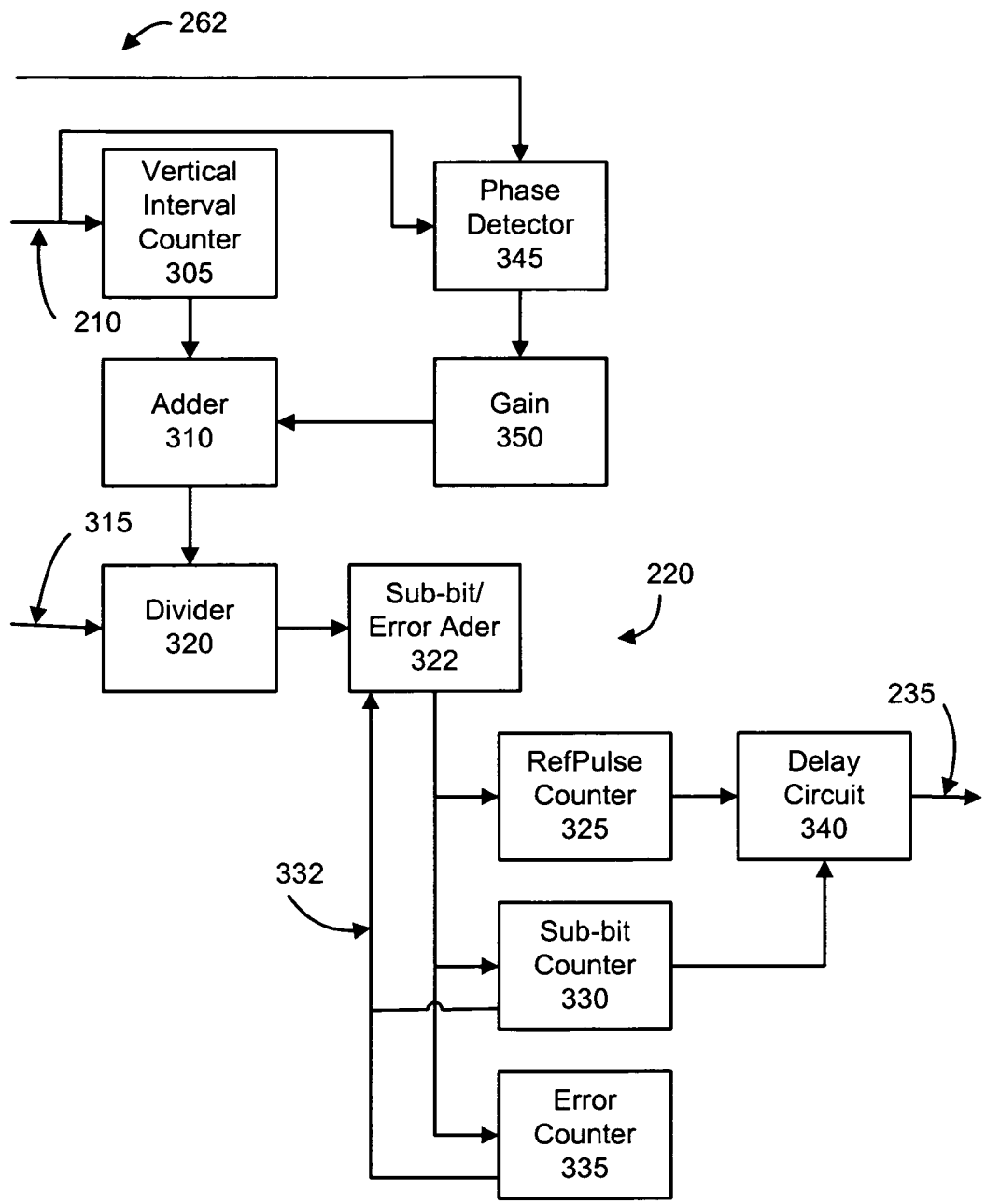
FIG. 3 is a vertical lock circuit configured to utilize a received input vertical sync signal to generate an intermediate frequency signal (reference pulse), according to an exemplary embodiment.

Referring now to FIG. 3, a vertical lock circuit 220 configured to utilize input vertical sync signal 210 to generate reference pulse signal 235 is shown, according to an exemplary embodiment. Circuit 220 includes a vertical interval counter 305, an adder 310, a divider 320, a sub-bit/error adder 322, a reference pulse counter 325, a sub-bit counter 330, a error counter 335, a delay circuit 340, a phase detector 345 and a gain 350. Although shown in a particular configuration and as having particular components, it should be understood that vertical lock circuit 220 may have more, fewer, and/or different components in a variety of configurations to provide the functionality described herein.

Generally, input vertical sync signal 210 is received by vertical interval counter 305 to determine how many local clocks per vertical sync are present in signal 210. According to an exemplary embodiment, a local clock used for this function may be an oscillator implementing a 200 MHz clock. This local clock is generally asynchronous to the input vertical sync signal 210. The counter number of local clocks per vertical sync may then be modified by a phase error function to bring the input and internal syncs into phase alignment. In this example, the modification by the phase error function is shown as a simple signed addition, although other phasing algorithms may alternatively be utilized. The result of the simple signed addition may then be divided by the number of reference pulses per vertical sync to calculate the number of local clocks needed per reference pulse. The number of local clocks needed per reference pulse may then be split into three parts: an integer of clocks (most significant bits), a sub integer number of clocks usable in the delay tap circuit (middle significant bits), and an amount less than the delay tap size (least significant bits).

The three parts may be used to generate the reference pulse to be sent to analog phase locked loop circuit 240. The reference pulse may be created by counting the most significant bits and adding the appropriate delay tap value. The delay tap value is changed every reference pulse and the value is an accumulation of the previous and current delay tap values. Eventually, this value will overflow and will increment the reference pulse counter to get the needed delay. The net result of this process is a reference pulse period accurate to the delay circuit tap step size. This size is a fraction of a local clock period. According to exemplary embodiment, the delay tap is 78 picoseconds, such that the reference pulse period is accurate to 78 picoseconds (5 nsec clock divided by 64 taps). The least significant bit error counter may be another accumulator that determines when an extra delay is needed to correct for accumulated error below the delay tap step. Overflow 332 is provided from Sub-bit counter 330 and Error counter 335 to adder 322. Accordingly, some reference pulse periods will have an extra delay tap step (78 picoseconds according to exemplary embodiment).

In operation, vertical interval counter 305 is configured to determine the number of local clocks per vertical sync signal. Vertical interval counter 305 may be a relatively large counter. For example, where the counter is receiving a 200 MHz local clock, counter 305 is used to determine the number of times 5 nanoseconds occurs in a 16.6 millisecond field.

Divider 320 is configured to receive the number of local clocks per vertical sync signal output from vertical interval counter 305 and divide that value by a number of reference pulses per vertical sync. Vertical lock circuit 220 further receives a control input 315 (not shown in FIG. 2) configured to receive an indication of the number of pulses per reference pulse signal 235 to be generated per input vertical sync signal 210 received. This reference pulse in the exemplary embodiment is equal to the number of lines per vertical sync. This control input may be set based on the type of display for which the output from circuit 200 is being generated. For example, for a 1280×1024 display, the number of lines per vertical sync would be 1066 lines. The output of divider 320 may be the number of local clocks occurring per line. Generally, the divider output is a non-integer number. For example, according to our exemplary embodiment, the output is 14.11, correlating to 14 integer bits and 11 non-integer bits to provide a reference pulse accuracy much better than the five nanoseconds period of the local clock.

Reference pulse counter 325, sub-bit counter 330, error counter 335, and input delay 340 are configured to create reference pulse signal 235. Sub-bit counter 330 is configured to drive a delay circuit that allows a programmable 64 taps per clock. Accordingly, reference pulse counter 325 provides accuracy to a five nanosecond level with a 200 MHz local clock. The sub-bit counter and delay circuit increases the accuracy to a 78 psec level by adding delay in a 64-tap delay block. Error counter 335 accounts for additional errors to determine when a 78 picosecond correction is needed.

Vertical lock circuit 220 further includes a phase alignment loop configured to correct phase discrepancies between the input vertical sync signal 210 and the output vertical sync signal 262 using phase detector 345 and gain 350. In operation, the output vertical sync signal 262 is the same frequency as the received input vertical sync signal 210. Phase detector 345 counts the number of local clocks between the two syncs. This value is scaled by gain 350 to adjust the phase of the output vertical sync signal 262 to bring it into alignment (or a programmable time offset) with the received input vertical sync signal 210 using adder 310.

With reference to FIGS. 2 and 3, the operation of video stream synchronization circuit 200 is described below. Vertical lock circuit 220 provides a reference signal at output 235. The reference signal, or HSync signal at output 235 (FIGS. 2 and 3) is generated using the vertical sync signal at input 210. As well understood in the art, the HSync signal has a greater frequency then the vertical sync signal in display applications.

In one or more embodiments, the vertical sync signal has a frequency of 60 hertz and the intermediate frequency signal or reference signal has a frequency at the HSync frequency which is greater than 60 hertz. In one or more embodiments, vertical lock circuit 220 uses a higher frequency local clock signal, such as a signal from a 200 megahertz oscillator, to generate the HSync signal or reference signal at a higher frequency than the vertical sync signal.

With reference to FIG. 3, vertical interval counter 305, phase detector 345, gain 350 and adder 310 form a digital phase lock loop that provides a digital value indicating the number of local clock signals per vertical sync signal to divider 320. Vertical interval counter 305 counts the number of local clocks that occur between pulses of the input vertical sync signal provided at input 210.

Differences between the time between pulses from the input vertical sync signal and the time between pulses of the output vertical sync signal are determined by phase detector 345 and adjusted using gain 350. The differences after adjustment by gain 350 are added to the number of local clock pulses that occur during the input vertical sync signal in adder 310. Gain 350 provides a digital value indication of the adjustment associated with the difference in phase between the input vertical sync signal and the output vertical sync signal from phase detector 345 in one or more embodiments. The digital value indication of the adjustment is provided to adder 310. Adder 310 adds the digital value from vertical interval counter 305 which indicates the number of local clock pulses per vertical sync signal at input 210 and the digital value indication of the adjustment. Accordingly, adder 310 provides a digital value indicative of the number of local clock signals per vertical sync signal after adjustment by the digital phase lock loop associated with counter 305, phase detector 345 and gain 350 to divider 320. The digital value provided to divider 320 can be referred to as a digital phase locked loop sync value.

Divider 320 divides the digital value associated with the number of local clock signals per vertical sync signal from adder 310 by the number of reference clock signals per vertical sync signal to provide the number of local clock signals per reference signal. The number of reference signals per vertical sync signal is provided at input 315. Divider 320 provides a digital value indicative of the number of local clock signals per reference signal to sub-bit-error adder 322.

The digital value indicative of the number of local clocks per reference signal from divider 320 is received by adder 322 and includes 3 components an integer portion (most significant bits) to be received by reference pulse counter 325, a fractional portion (middle significant bits) to be received by sub-bit counter 320, and a fractional portion (least significant bits) to be received by error counter 335. The 3 components of the digital value (e.g. the quotient) from divider 320 are processed by 3 counters: reference pulse counter 325, sub-bit counter 330 and error counter 335 in one or more embodiments. Counter 325 handles the integer portion and counts the most significant bits. Counter 330 handles the middle significant bits and drives the delay circuit in accordance with 64 taps per clock pulse according to one embodiment. Error counter 335 handles the least significant bits.

Reference pulse counter 325 is clocked by the local clock signal and provides the reference signal or HSync signal via delay circuit 340 at output 235 according to the quotient from divider 320. Reference pulse counter 325 counts the number of local clock signals and provides a pulse when the number of local clock signals equals the number provided by divider 320 adjusted by adder 322. Adder 322 adjusts the quotient provided by divider 320 in accordance with overflow values provided by sub-bit counter 320 and error counter 335 on overflow 332 as explained below. Accordingly, counter 325 provides a pulse when the number of local clock signals equals the integer portion provided by divider 320 adjusted by adder 332 (e.g., provides a pulse after the appropriate number of local clock signals has been provided).

Delay circuit 340 provides a delay defined by the value in sub-bit counter 330 for the reference signal or HSync signal at output 235. Sub-bit counter 330 counts the appropriate number of delay taps based upon the fraction provided by adder 322 to counter 330. The number of delay taps does not correspond exactly to the fraction so the remainder of the fraction above the number of delay taps is accumulated in error counter 335. Error counter 335 provides the accumulated delay or error to sub-bit error adder 322 which in turn adjusts the integer value for the reference pulse counter 325 or the fraction value for sub-bit counter 330 in accordance with the error. The accumulated delay is provided via overflow 332.

Sub-bit-error adder 322, reference pulse counter 325, sub-bit counter 330, error counter 335 and delay circuit 340 increase accuracy caused by error related to the number of local clock signals in the reference signal not being a whole number. Generally, the output of divider 320 is a non-integer number (e.g. includes integer bits and non-integer bits). Sub-bit-error adder 322 receives sub-bits (bits representing the fractional portion) from error counter 335 and from divider 322. The sub-bits from error counter 335 represent delay that was accumulated from the last cycle. The sub-bits are added and if the addition of sub-bits is greater than 1, 1 is added to integer number for counter 325 which counts the integer number of pulses from divider 320. Any remainder below 1 is provided to counter 330 as sub-bits in one or more embodiments.

Sub-bit counter 320 counts the number of delay taps associated with the non-integer (fractional) number. Delay circuit 340 implements the phase delay associated with the number of delay taps. Error counter 335 accounts for additional error to determine when a delay tap correction is needed.

In one embodiment, the display can be a 1280 by 1024 display which has a total of 1066 total lines per field if some of the lines are not used for visual displayed information according to one embodiment. A 1280-1024 display having 1066 total lines per field is an industry standard. The extra lines are referred to as a vertical front porch, vertical sync and vertical back porch, or an aggregate vertical blank time as is well known in the art.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of delay circuit, local oscillator, or video timing generator used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A vertical synchronization circuit for synchronizing multiple video streams using an input vertical sync signal, comprising:

a digitally controlled circuit configured to generate a digital phase locked vertical sync value from the input vertical sync signal and an output vertical sync signal in a digital phase lock loop and to generate an intermediate horizontal sync signal at a frequency higher than the frequency of the input vertical sync signal based on the digital phase locked vertical sync value using a local oscillator clock signal having a higher frequency than the intermediate horizontal sync signal, the intermediate horizontal sync signal being locked to the input vertical sync signal, wherein the digital phase locked vertical sync value is a number representing the number of pulses of the local oscillator clock signal per the input vertical sync signal, and the digital phase vertical sync value is provided by an adder in the digital phase locked loop;

an analog phase lock loop circuit configured to convert the intermediate horizontal sync signal into a pixel clock; and a circuit configured to generate the output vertical sync signal and an output horizontal sync signal based on the pixel clock, wherein the digitally controlled circuit comprises counters configured to generate the intermediate horizontal sync signal based on the digital phase locked vertical sync value and a programmable number of intermediate horizontal sync pulses of the intermediate horizontal sync signal per the input vertical sync signal.

2. The circuit of claim 1, wherein the counters are driven by the local oscillator clock signal.

3. The circuit of claim 2, wherein the counters include at least an HSync counter and a sub-bit counter configured to provide accuracy to less than one local oscillator clock cycle.

4. The circuit of claim 3, wherein the accuracy of the generated intermediate horizontal sync signal is independent of a local oscillator associated with the digitally controlled circuit.

5. The circuit of claim 4, wherein a sub-bit counter and an error counter ensure that the maximum variation of the intermediate horizontal sync signal during a vertical sync interval is less than a local oscillator clock cycle.

6. The circuit of claim 1, wherein the digitally controlled circuit includes a phase adjustment circuit configured to align the phase of the input vertical sync signal to at least one of the generated output synchronization signals.

7. The circuit of claim 6, wherein aligning the phase of the input vertical sync signal to the generated output synchronization signals includes aligning the signals based on a fixed offset amount.

8. A video synchronization system for synchronizing multiple video streams using a master vertical sync signal, comprising:

a master computing system configured to provide video stream information to a plurality of video displays and to generate a master vertical sync signal configured to synchronize the display of the video stream information on the video displays; and a video synchronization circuit associated with each of the plurality of displays, including a digitally controlled circuit configured to generate a digital phase locked vertical sync value from the master vertical sync signal and an output vertical sync signal and to generate a horizontal sync signal at a frequency higher than the frequency of the master vertical sync signal using a local oscillator clock signal having a higher frequency than the horizontal sync signal, the horizontal sync signal being locked to the master vertical sync signal, wherein the digital phase locked vertical sync value is a number representing the number of pulses of the local oscillator clock signal per the master vertical sync signal, an analog phase lock loop circuit configured to convert the horizontal sync signal into a pixel clock, and a circuit configured to generate output synchronization signals based on the pixel clock, wherein the digitally controlled circuit comprises counters configured to generate the horizontal sync signal based on a number of the pulses of the local oscillator clock signal measured per the master vertical sync signal and a programmable number of horizontal sync signal pulses to be generated per the master vertical sync signal.

9. The system of claim 8, wherein the counters are driven by the local oscillator clock signal.

10. The system of claim 9, wherein the counters include at least an HSync counter and a sub-bit counter configured to provide accuracy to less than one local oscillator clock cycle.

11. The system of claim 10, wherein the accuracy of the generated horizontal sync signal is independent of a local oscillator associated with the digitally controlled circuit.

12. The system of claim 11, wherein a sub-bit counter and an error counter guarantee the maximum variation of the horizontal sync signal during a vertical sync interval is less than a local oscillator clock cycle.

13. The system of claim 8, wherein the digitally controlled circuit includes a phase adjustment circuit configured to align the phase of the master vertical sync signal to at least one of the generated output synchronization signals.

14. The system of claim 13, wherein aligning the phase of the master vertical sync signal to the generated output synchronization signals includes aligning the signals based on a fixed offset amount.

15. A method for synchronizing multiple video streams using an input vertical sync signal, comprising:

generating a digital phase locked vertical sync value from the input vertical sync signal and an output vertical sync signal to generate an intermediate horizontal sync signal based on the digital phase locked vertical sync value at a frequency higher than the frequency of the input vertical sync signal using a programmable input configured to receive one or more characteristics of a target display and a local oscillator clock signal having a higher frequency than the intermediate horizontal sync signal, the intermediate horizontal sync signal being locked to the input vertical sync signal, wherein the digital phase locked vertical sync value is a number representing the number of pulses of the local oscillator clock signal per the input vertical sync signal;

generating the intermediate horizontal sync signal using counters based on a number of local oscillator clocks measured per input vertical sync signal and a programmable number of intermediate frequency pulses to be generated per vertical sync signal;

converting the intermediate horizontal sync signal into a pixel clock using an analog phase locked loop circuit; and generating output synchronization signals based on the pixel clock.

16. The method of claim 15, further comprising driving the counters with a local oscillator clock signal.

17. The method of claim 16, wherein the maximum variation of the intermediate horizontal sync signal during a vertical sync interval is less than a local oscillator clock cycle.

18. The method of claim 15, wherein the accuracy of the generated intermediate horizontal sync signal is independent of a local oscillator associated with the digital phase lock loop circuit.

19. The method of claim 15, further including providing at least one of the output synchronization signals to a phase detector and scale to align the phase of the input vertical sync signal to the provided output synchronization signals.

20. The method of claim 19, wherein aligning the phase of the input vertical sync signal to the generated output synchronization signals includes aligning the signals based on a fixed offset amount.

* * * * *